United States Patent [19]

Shimada

[11] Patent Number: 4,745,306
[45] Date of Patent: May 17, 1988

[54] HALF ADDER HAVING A PAIR OF PRECHARGED STAGES

[75] Inventor: Jiroh Shimada, Tokyo, Japan

[73] Assignee: NEC Corporation, Japan

[21] Appl. No.: 925,307

[22] Filed: Oct. 31, 1986

[30] Foreign Application Priority Data

Oct. 31, 1985 [JP] Japan .................. 60-245396

[51] Int. Cl.$^4$ .................. G06F 7/42; H03K 19/096
[52] U.S. Cl. .................. 307/472; 307/451; 307/481; 364/768
[58] Field of Search .................. 307/448, 451, 452–453, 307/468–469, 472, 481, 584–585; 364/716, 768, 784

[56] References Cited

U.S. PATENT DOCUMENTS

| | | | |
|---|---|---|---|
| 3,766,371 | 10/1973 | Suzuki | 364/784 |
| 4,363,107 | 12/1982 | Ohhashi et al. | 307/472 X |
| 4,564,921 | 1/1986 | Suganuma | 307/472 X |
| 4,569,032 | 2/1986 | Lee | 307/452 X |
| 4,601,007 | 7/1986 | Uya et al. | 364/784 |
| 4,621,338 | 11/1986 | Uhlenhoff | 364/784 |

OTHER PUBLICATIONS

Bula et al., "Multi-Purpose Half-Adder", IBM T.D.B., vol. 25, No. 11A, Apr. 1983, pp. 5668-5669.
Bechade et al., "Programmable Arithmetic/Logic Circuit", IBM T.D.B., vol. 23, No. 11, Apr. 1981, pp. 4870-4873.

*Primary Examiner*—Stanley D. Miller
*Assistant Examiner*—D. R. Hudspeth
*Attorney, Agent, or Firm*—Laff, Whitesel, Conte & Saret

[57] ABSTRACT

A half adder includes a first drive stage having an input and connected at its output a carry output and a second drive stage having an input and connected at its output to an addition data output. Further, a circuit is provided to precharge the inputs and the outputs of the first and second drive stages at a first timing so as to put these drive stages in a first logic condition, and then to put these drive stages in an operable condition at a second timing later than the first timing. A first logic stage is connected to a data input and a carry input, respectively, so as to generate a first logical signal to the inputs of the first and second drive stages, when the data input and the carry input assume a first logic level, thereby to put the drive stages in a second logic condition opposite to the first logic condition. Futhermore, a second logic stage is connected to the output of the second drive stage and having inputs connected to the data input and the carry input, respectively. This second logic stage is adapted to forcedly change the logic level of the second drive stage output when the data input and the carry input assume a second logic level opposite to the second logic level and at a third timing later than the second timing.

10 Claims, 2 Drawing Sheets

HALF ADDER HAVING A PAIR OF PRECHARGED STAGES

BACKGROUND OF THE INVENTION

1. Field of the Invention

The present invention relates to a half adder, and more specifically to a half adder composed of field effect transistors (abbreviated "FETs" in this specification).

2. Description of Related Art

Heretofore, the half adder is often constituted of a combination of so-called CMOS logic gates. Referring to FIG. 1, there is shown one typical two-bit half adder, which includes a less significant bit half adder 10 and a more significant bit half adder 12 adapted to receive a carry signal from the half adder 10. The first half adder 10 includes a NOR gate 14 and a NAND gate 16 both of which are connected to receive an external data signal $D_1$ and a carry signal $C_1$. The NOR gate 14 has an output connected to one input of another NOR gate 18, and the NAND gate 16 is connected at its output through a NOT gate 20 to another input of the NOR gate 18. Thus, this NOR gate 18 generates an addition data signal $S_1$ to an external, and the NOT gate 20 outputs a carry signal $C_2$ to the just more significant half adder 12. These logic gates 14 to 20 are all CMOS logic gates.

The half adder 12 has the same arrangement as that of the half adder 10 mentioned just above. But, the half adder 12 is adapted to receive an external data signal $D_2$ and the carry signal $C_2$ from the one-bit half adder 10 and operates to generate an addition data signal $S_2$ and a carry signal $C_3$.

These one-bit half address 10 and 12 operate in the same manner, and so, operation will be explained on one of the adders 3.

When the two inputs, i.e., the input data signal $D_1$ and the carry signal $C_1$ are both "0", the output of the NOR gate 14 assumes the logical value "1", and so, the output of the NOR gate 18, i.e., the addition data signal $S_1$ is brought to the logical value "0". At this time, the NAND gate 16 outputs the logical value "1", so that the output of the NOT gate 20, i.e., the carry signal $C_2$ assumes the logical value "0".

If one of the two inputs is at the logical value "1", and the other input is at the logical value "0", both of the NOR gate 14 and the NOT gate 20 output the logical value "0". Therefore, the addition data signal $S_1$ is brought into the logical value "1" and the carry signal $C_2$ is brought to the logical value "0".

When both of the two inputs are at the logical value "1", the NOT gate 20 generates the logic value "1". As a result, the addition data signal $S_1$ indicates the logical value "0" and the carry signal $C_2$ shows the logical value "1".

It will be understood that the above logical relation between the inputs and outputs indicates the logical function of a so-called half adder.

As well known, NOR gates and NAND gates of the CMOS logic need four FETs, and NOT gates require two FETs in the CMOS logic. Therefore, the half adder shown in FIG. 1 needs 14 FETs per one bit. Thus, if a half adder of n bits is constructed, 14n FETs are required. For example, a conventional 16-bit half adder is constituted of 224 FETs. This means that a power consumption is large, and if half adders are assembled into integrated circuits, a large chip area is required and interconnection wiring is very complicated.

Furthermore, each carry signal line is connected to 4 FETs at the input of the half adder and to 4 FETs at the output. Namely, the carry signal line is connected to 8 FETs in total. This means that a load to the carry signal is large, with the result that the carry signal operation time is inevitably long. In other words, the carry signal operation is delayed in comparison with the other operation, and therefore, the operation speed of the half adder is limited.

SUMMARY OF THE INVENTION

Accordingly, it is one object of the present invention to provide a half adder which has dissolved the above mentioned drawbacks of the conventional circuits.

Another object of the present invention is to provide a half adder which can be constructed of a decreased number of FETs.

Still another object of the present invention is to provide a half adder which can operate with a reduced power consumption and which can be assembled in integrated circuits with a decreased chip area.

A further object of the present invention is to provide a half adder with a decreased load to a carry signal.

A still further object of the present invention is to provide a half adder which can operate at a high speed as compared with the conventional half adder.

The above and other objects of the present invention are achieved in accordance with the present invention by a half adder which includes at least one data input, one carry input, one addition data output and one carry output, comprising:

a first drive stage having an input and connected at its output to the carry output;

a second drive stage having an input and connected at its output to the addition data output;

a circuit operating to precharge the inputs and the outputs of the first and second drive stages at a first timing so as to put these drive stages in a first logic condition, and then to put these drive stages in an operable condition at a second timing later than the first timing;

a first logic stage having inputs connected to the data input and the carry input, respectively, and generating a first logical signal to the inputs of the first and second drive stages, when the data input and the carry input assume a first logic level, thereby to put the drive stages in a second logic condition opposite to the first logic condition; and a second logic stage connected to the output of the second drive stage and having inputs connected to the data input and the carry input, respectively, the second logic stage being adapted to forcedly change the logic level of the second drive stage output when the data input and the carry input assume a second logic level opposite to the first logic level and at a third timing later than the second timing.

In one embodiment of present invention, the first drive stage includes a first field effect transistor and the second stage includes a second fuel effect transistor. These first and second transistors are connected at their gates commonly to the output of the first logic stage and at their one ends to a first supply voltage terminal. The other end of the first transistor is connected to the carry output and the other end of the second transistor is connected to the addition data output.

The precharge circuit includes a third field effect transistor connected at its one end to the first supply voltage terminal and at its other end to the gates of the first and second transistors. The third transistor being adapted to be turned on at the first timing, thereby to precharge the gates of the first and second transistors to the first supply voltage.

The precharge circuit also includes fourth and fifth field effect transistors connected at their one ends to a second supply voltage terminal. The other ends of the fourth and fifth transistors are connected to the other ends of the first and second transistors, respectively. The fourth and fifth transistors are adapted to be turned on at the first timing thereby to precharge the other ends of the first and second transistors to the second supply voltage.

The first logic circuit includes sixth and seventh field effect transistors connected in series between the other end of the third transistor and the second supply voltage terminal. The sixth transistor is connected at its gate to the carry input and the seventh transistor is connected at its gate to the data input, so that both the sixth and seventh transistors are turned on when the data input and the carry input assume the first logic level.

The second logic circuit includes eighth, ninth and tenth field effect transistors connected in series between the first supply voltage terminal and the other end of the second transistor. The eighth and ninth transistors are connected at their gates to the data input and the carry input, respectively, and the tenth transistor is adapted to be turned on at the third timing, whereby all the eighth, ninth and tenth transistors are turned on to forcedly change the potential of the other end of the second transistor to the first supply voltage.

In a preferred embodiment, the first, second, third, eighth, ninth and tenth transistors are of a first channel type, and the fourth to seventh transistors are of a second channel type opposite to the first channel type.

According to another aspect of present invention, there is provided a half adder which includes at least one data input, one carry input, one addition data output and one carry output, comprising:

first and second first effect transistors connected commonly at their gates and at their one ends to a first supply voltage terminal, the other end of the first transistor being connected to the carry output and the other end of the second transistor being connected to the addition data output;

a third field effect transistor connected at its one end to the first supply voltage terminal and at its other end to the gates of the first and second transistors, the third transistor being adapted to be turned on at a first timing, thereby to precharge the gates of the first and second transistors to the first supply voltage, and the third transistor being turned off at a second timing later than the first timing so that the gates of the first and second transistors are isolated from the first supply voltage;

fourth and fifth field effect transistors connected at their one ends to a second supply voltage terminal, the other ends of the fourth and fifth transistors being connected to the other ends of the first and second transistors, respectively, the fourth and fifth transistors being adapted to be turned on at the first timing thereby to precharge the other ends of the first and second transistors to the second supply voltage, and the fourth and fifth transistors being turned off at the second timing so that the other ends of the first and second transistors are isolated from the second supply voltage;

sixth and seventh field effect transistors connected in series between the other end of the third transistor and the second supply voltage terminal, the sixth transistor being connected at its gate to the carry input and the seventh transistors being connected at its gate to the data input, so that both the sixth and seventh transistors are turned on when the data input and the carry input assume a first logic level; and eighth, ninth and tenth field effect transistors connected in series between the first supply voltage terminal and the other end of the second transistor, the eighth and ninth transistors being connected at their gates to the data input and the carry input, respectively, and the tenth transistor being adapted to be turned on at a third timing later than the second timing, whereby all the eighth, ninth and tenth transistors are turned on to forcedly change the potential of the other end of the second transistor to the first supply voltage, when the data input and the carry input assume a second logic condition opposite to the second logic condition.

The above and other objects, features and advantages of the present invention will be apparent from the following description of the preferred embodiment of the invention with reference to the accompanying drawings.

DESCRIPTION OF THE PREFERRED EMBODIMENT

Figure 2:
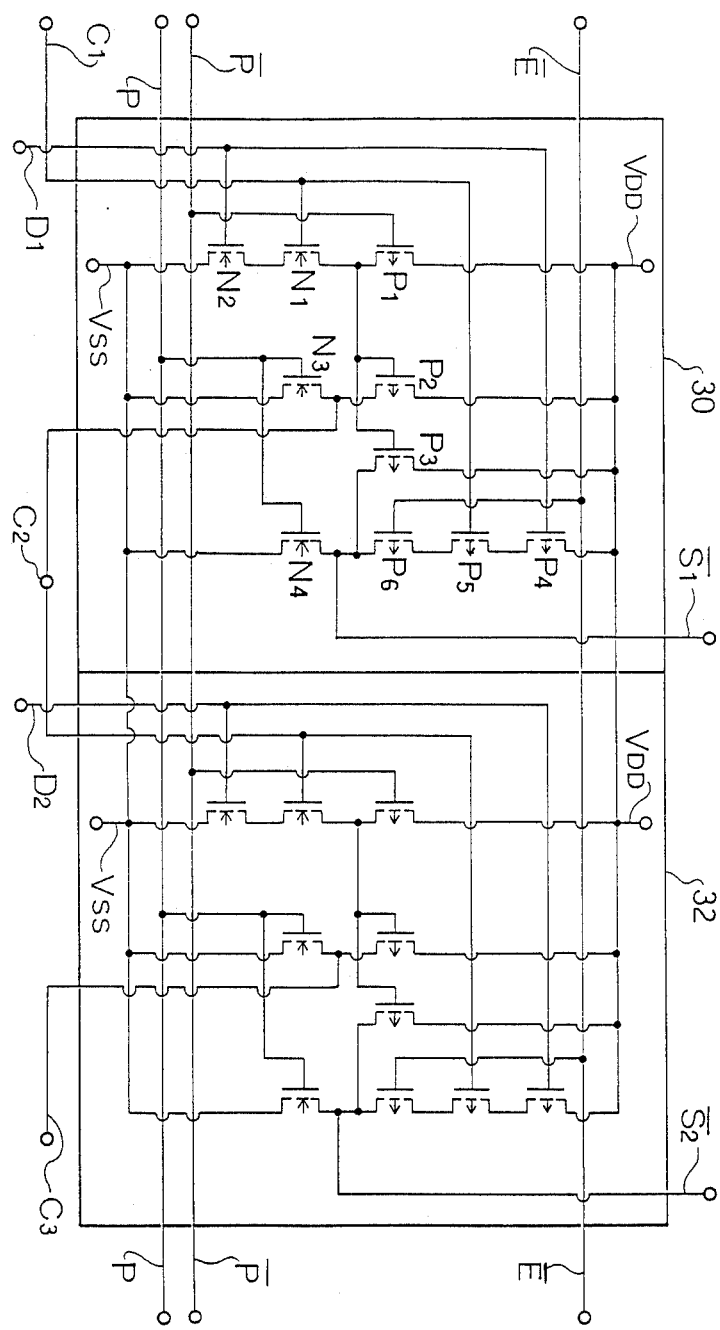
FIG. 2 is a circuit diagram of an embodiment of the half adder in accordance with the present invention.

Referring to FIG. 2, there is shown an embodiment of the half adder in accordance with the present invention. The shown embodiment is a two-bit half adder consisting of a less significant bit half adder 30 and a more significant bit half adder 32. These half adders 30 and 32 have the same circuit structure and are connected between a pair of supply voltages $V_{DD}$ and $V_{SS}$. In addition, these half adders receive the same enable signal $\overline{E}$ and a pair of precharge signals P and $\overline{P}$. But, the less significant half adder 30 receives an input data signal $D_1$ and a carry signal $C_1$ and outputs an addition data signal $\overline{S}_1$ and a carry signal $C_2$. On the other hand, the more significant half adder 32 receive the carry signal $C_2$ from the half adder 30 and an input data signal $D_2$ and generates an addition data signal $\overline{S}_2$ and a carry signal $C_3$.

As mentioned above, since the two one-bit half adders have the same construction, and therefore operate in the same manner, explanation will be made only to the half adder 30.

The half adder 30 includes a P-channel FET $P_1$, and two N-channel FETs $N_1$ and $N_2$ which are connected in series in the named sequence between the supply voltages $V_{DD}$ and $V_{SS}$, FET $P_1$ receives at its gate the precharge signal $\overline{P}$, and FET $N_1$ receives at its gate the carry signal $C_1$. FET $N_2$ receives at its gate the input data signal $D_1$.

Further, a P-channel FET $P_2$ and an N-channel FET $N_3$ are connected in series between the supply voltages $V_{DD}$ and $V_{SS}$. FET $P_2$ is connected at its gate to the drain of FET $P_1$. FET $N_3$ is connected to receive the precharge signal P. In addition, the drain of FET $P_2$ is connected to a terminal for a carry signal $C_2$, and the gate of FET $P_2$ is connected to a gate of a P-channel FET $P_3$, whose source is connected to the supply voltage $V_{DD}$.

Furthermore, three P-channel FETs $P_4$, $P_5$ and $P_6$ and one N-channel FET $N_4$ are connected in series in the named order between the supply voltages $V_{DD}$ and $V_{SS}$. FET $P_4$ has its gate connected to the gate of FET $N_2$ so as to receive the input data signal $D_1$. FET $P_5$ is connected at its gate to the gate of FET $N_1$ so as to receive the carry signal $C_1$. The gate of FET $P_6$ is connected to receive an enable signal $\bar{E}$, and the drain of FET $P_6$ is connected to the drain of FET $P_3$ and a terminal for the addition data signal $S_1$. FET $N_4$ has its gate connected to the gate of FET $N_3$ so as to receive the precharge signal P.

Figure 1:
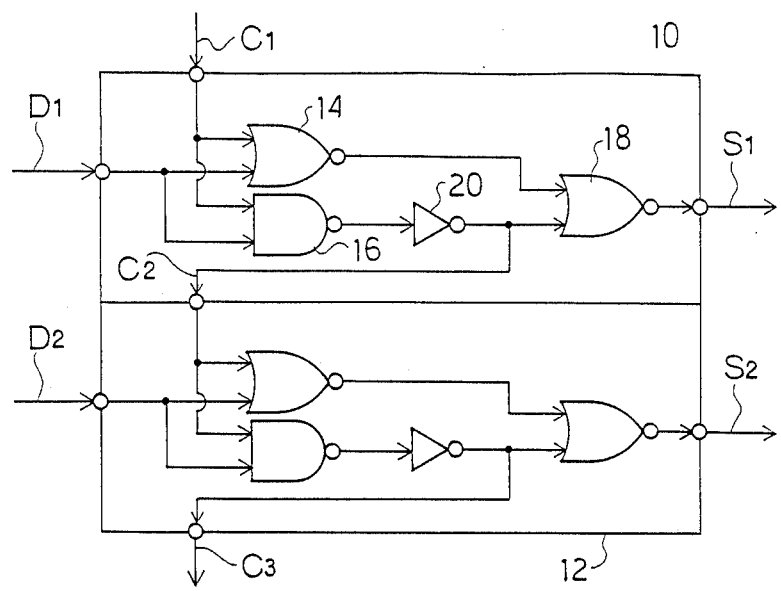
FIG. 1 is a logic circuit diagram illustrating a typical conventional half adder.
Figure 3:
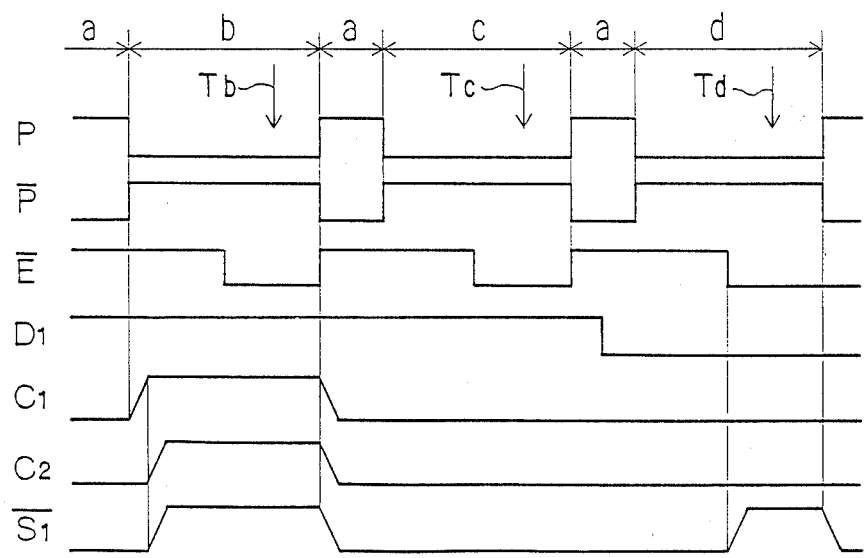
FIG. 3 is a timing chart for explaining the operation of the circuit shown in FIG. 2.

Next, operation will be explained with reference to FIG. 3 illustrating the waveforms at various points in the circuit shown in FIG. 2.

As seen from FIG. 3, the precharge signal P assumes a logical level of "1" during a period "a" and a logical level of "0" during periods "b", "c" and "d". On the other hand, the precharge signal $\bar{P}$ is in reverse phase to the precharge signal P. The enable signal $\bar{E}$ is brought to the logical level of "1" at the start of each period "a", and then is brought to the logical level of "0" at an intermediary of the periods "b", "c", "d", . . .

During each period "a", the carry signal $C_1$ is necessarily made to the logic value "0". Therefore, FET $N_1$ is turned off. At this time, since FET $P_1$ is turned on by a low level precharge signal $\bar{P}$, the gates of FETs $P_2$ and $P_3$ are charged to the supply voltage $V_{DD}$. Namely, FET $P_3$ is turned off. On the other hand, FETs $N_3$ are $N_4$ are turned on by a high level precharge signal P. Therefore, the drains of FETs $P_2$ and $P_3$ are charged to the supply voltage $V_{SS}$, i.e., to the potential of the logical value "0". Thus, both the carry signal $C_2$ and the addition data signal $\bar{S}_1$ are put at the logical value "0".

As seen from the above, during the above mentioned period "a", the gates and the drains of FETs $P_2$ and $P_3$ are precharged so that the circuit is set at an initial condition of operation cycle. In this operation, FETs $P_1$ FETs $N_3$ and $N_4$ serve as switch mean for controlling the precharge.

The period "b" shown in FIG. 3 shows an example of operation when both the input data signal $D_1$ and the carry signal $C_1$ are at the logical value "1". In this condition, FETs $N_2$ and N are turned on, and FET $P_1$ is turned off by a high level precharge signal $\bar{P}$. Therefore, the gates of FETs $P_2$ and $P_3$ are brought to the supply voltage $V_{SS}$, so that these FETs are turned on. On the other hand, FETs $N_3$ and $N_4$ are turned off by a low level precharge signal P. Thus, the drains of FETs $P_2$ and $P_3$, i.e., the carry signal $C_2$ and the addition signal $\bar{S}_1$ are brought to the potential of the supply voltage $V_{DD}$ indicating the logical value "1".

The period "c" of FIG. 3 illustrates the operation when the input data signal $D_1$ and carry signal $C_1$ are at the logical values "1" and "0", respectively. In this condition, FETs $N_1$ and $P_5$ are turned on, and FETs $N_2$ and $P_4$ are turned off. In addition, FET $P_1$ is turned off by the high level precharge signal $\bar{P}$, and so, the gates of FETs $P_2$ and $P_3$ are maintained at the level precharged during the period "a", i.e., at the supply voltage $V_{DD}$. Accordingly FETs $P_2$ and $P_3$ are maintained off. On the other hand, FETs $N_3$ and $N_4$ are turned off by the low level precharge signal P. Thus, the drains of FETs $P_2$ and $P_3$ are maintained at the level precharged during the period "a", i.e., the supply voltage $V_{SS}$. Namely, both the carry signal $C_2$ and the addition data signal $\bar{S}_1$ assume the logical value "0".

The above mentioned operation will not change even if the logical value relation between the input data signal $D_1$ and the input carry signal $C_1$ is reversed, i.e., even if the signals $D_1$ and $C_1$ are at the logical values "1" and "0", respectively. Namely, in such a case, the output carry signal $C_2$ and the addition data signal $\bar{S}_1$ are both at the logical value "0".

The period "d" of FIG. 3 shows the operation when both the input data signal $D_1$ and the carry signal $C_1$ are at the logical value "0". In this condition, FETs $N_1$ and $N_2$ are maintained off and FETs $P_4$ and $P_5$ are maintained on. Further, FET $P_1$ is turned off by the high level precharge signal $\bar{P}$. Therefore, FETs $P_2$ and $P_3$ are maintained off continuously to the period "a". On the other hand, FETs $N_3$ and $N_4$ are turned off by the low level precharge signal P, with the result that the drains of FETs $P_2$ and $P_3$ are maintained at the level precharged during the period "a", while FET $P_6$ are maintained off, i.e., while the enable signal $\bar{E}$ assumes the logical value "1". Accordingly, both the carry signal $C_2$ and the addition data signal $\bar{S}_1$ are maintained at the logical value "0".

However, if the enable signal $\bar{E}$ is brought to the logical value "0" at the intermediary of the period "d", FET $P_6$ are turned on. Since FETs $P_4$ and $P_5$ have already been turned on, the drain of FET $P_6$ is charged to the supply voltage $V_{DD}$. Namely, the addition data signal $\bar{S}_1$ is brought to the logical value "1". On the other hand, the carry signal $C_2$ is maintained at the logical value "0".

Therefore, as seen from FIG. 3, the carry signal $C_2$ and the addition data signal $\bar{S}_1$ are sampled at a predetermined timing $t_d$ during the period of time that both of the precharge signal $\bar{P}$ and the enable signal $\bar{E}$ are at the logical level "0".

As seen from the above, FET $P_6$ acts as switch means for controlling the enable operation.

Therefore, as seen from the timing $T_b$, $T_a$ and $T_c$ shown in FIG. 3, the carry signal $C_2$ and the addition data signal $\bar{S}_1$ are sampled from the hall adder 30 at the predetermined timing during the period of time that both of the precharge signal P and the enable signal $\bar{E}$ are at the logical level "0". In the case of input signal combination illustrated by the periods "b" and "c", the signals $C_2$ and $\bar{S}_1$ do not change their level during the low level period of the precharge signal P, and therefore, the signals $C_2$ and $\bar{S}_1$ can be sampled at any time during the low level period of the precharge signal P. However, in the case of input signal combination illustrated by the periods "d", for the purpose of obtaining a correct addition data signal it is necessary to perform the sampling at a predetermined timing during the period of time that both of the precharge signal P and the enable signal $\bar{E}$ are at the logical level "0". Thus, the half adder 30 operates to fulfil the input-output logical relation required in the half adder.

As is apparent from the above description, the one-bit half adder 30 can be constituted of 10 FETs. Therefore, if a 16-bit half adder is constructed by combining 16 one-bit half adders similar to the half adder 30, it can be formed of 160 FETs. Furthermore, each carry signal line is connected to two FETs at an input side of the half adder and to two FETs at an output side. Namely, each carry signal line is connected to four FETs in total.

Therefore, a load to the carry signal is made small, and so, the half adder can operate at a high speed.

In the above mentioned embodiment, FETs $P_1$, $N_3$, $N_4$ and $P_6$ can be replaced with other switching elements. In addition, the input data signal $D_1$ and the carry signal $C_1$ can be connected to FETs $N_1$ and $N_2$, and FET $P_5$ and $P_4$, respectively by reversing the signal connection relation to these FETs. Such a modified half adder will operate in the same manner as that of the half adder shown in FIG. 2. Furthermore, even if FETs $P_4$, $P_5$ and $P_6$ are substituted for one another, the half adder will operate without any problem.

Further, the shown half adder is of positive logic in which the high level signal indicates the logical value "1". But, the present invention can be applied to a negative logic half adder circuit.

The invention has thus been shown and described with reference to specific embodiments. However, it should be noted that the invention is in no way limited to the details of the illustrated structures but changes and modifications may be made within the scope of the appended claims.

I claim:

1. A half adder which includes at least one data input, one carry input, one addition data output and one carry output, said adder comprising:
   a first drive stage having an input and being connected at its output to the carry output;
   a second drive stage having an input and being connected at its output to the addition data output;
   a circuit coupled to the inputs and the outputs of the first and second drive stages and also coupled to receive a first timing signal for precharging the inputs and the outputs of the first and second drive stages for a first timing period defined by the first timing signal so that the inputs and the outputs of the first and second drive stages are respectively forced into predetermined logic voltage levels which are defined as a result of the precharge, the precharging circuit being disabled during a second timing period succeeding the first timing period, said precharging circuit acting as a load for the first and second drive stages;
   a first logic stage having inputs connected to the data input and the carry input, respectively, and also having an output connected to inputs of the first and second drive stages so as to apply a first logical signal to the inputs of the first and second drive stages if the data input and the carry input assume a first logic level during the second timing period, whereby the inputs and the outputs of the drive stages assume the respective logic levels which are opposite to the predetermined logic levels which result from the precharge; and
   a second logic stage connected to the output of the second drive stage and having inputs connected to the data input and the carry input, respectively, the second logic stage being coupled to receive a second timing signal to forcibly change the logic level of the second drive stage output when the data input and the carry input assume a second logic level which is opposite to the first logic level, at a timing which is included in the second timing period and is defined by the second timing signal.

2. The half adder as claimed in claim 1 wherein the first drive stage includes a first field effect transistor and the second stage includes a second field effect transistor, said first and second transistors having commonly connected gates coupled to the output of the first logic stage and at their one ends to a first supply voltage terminal, and being connected at their other end of the first transistor to the carry output, the other end of the second transistor being connected to the addition data output.

3. The half adder as claimed in claim 2 wherein the precharge circuit includes a third field effect transistor connected at its one end to the first supply voltage terminal and at its other end to the commonly connected gates of the first and second transistors, the third transistor being coupled to respond to the first timing signal for precharging the gates of the first and second transistors to the first supply voltage.

4. The half adder as claimed in claim 3 wherein the precharge circuit also includes fourth and fifth field effect transistors connected at their one ends to a second supply voltage terminal, the other ends of the fourth and fifth transistors being connected to the other ends of the first and second transistors, respectively, the fourth and fifth transistors being coupled to respond to the first timing signal for precharging the other ends of the first and second transistors to the second supply voltage.

5. The half adder as claimed in claim 4 wherein the first logic circuit includes sixth and seventh field effect transistors connected in series between the other end of the third transistor and the second supply voltage terminal, the sixth transistor having a gate connected to the carry input and the seventh transistor having a gate connected to the data input, so that both the sixth and seventh transistors are turned on when the data input and the carry input assume the first logic level.

6. The half adder as claimed in claim 5 wherein the second logic circuit includes eighth, ninth and tenth field effect transistors connected in series between the first supply voltage terminal and the other end of the second transistor, the eighth and ninth transistors having gates connected to the data input and to the carry input, respectively, and the tenth transistor being coupled to receive the second timing signal, whereby when all of the eighth, ninth and tenth transistors are turned on, the potential at the other end of the second transistor is forcibly changed to the first supply voltage.

7. The half adder as claimed in claim 6 wherein the first, second, third, eighth, ninth and tenth transistors are a first channel conductivity type, and the fourth to seventh transistors are a second channel conductivity type opposite to the first channel type.

8. A half adder which includes at least one data input, one carry input, one addition data output and one carry output, comprising:
   first and second field effect transistors having gates connected to each other and commonly connected at their one ends to a first supply voltage terminal, the other end of the first transistor being connected to the carry output and the other end of the second transistor being connected to the addition data output;
   a third field effect transistor connected at its one end to the first supply voltage terminal and connected at its other end to the gates of the first and second transistors, the third transistor being coupled to receive a first timing signal for precharging the gates of the first and second transistors to the first supply voltage during a first timing period defined by the first timing signal, the third transistor being turned off during a second timing period succeeding to the first timing period so that the gates of the first and second transistors are isolated from the first supply voltage;

fourth and fifth field effect transistors connected at their one ends to a second supply voltage terminal, the other ends of the fourth and fifth transistors being connected to the other ends of the first and second transistors, respectively, the fourth and fifth transistors being coupled to receive the first timing signal so as to be turned on during the first timing period for precharging the other ends of the first and second transistors to the second supply voltage, the fourt and fifth transistors being turned off for the second timing period so that the other ends of the first and second transistors are isolated from the second supply voltage;

sixth and seventh field effect transistors connected in series between the other end of the third transistor and the second supply voltage terminal, the sixth transistor having a gate connected to the carry input and the seventh transistors having a gate connected to the data input, so that both the sixth and seventh transistors are turned on when the data input and the carry input assume a first logic level, respectively; and eighth, ninth and tenth field effect transistors connected in series between the first supply voltage terminal and the other end of the second transistor, the eighth and ninth transistors having gates connected to the data input and the carry input, respectively, the tenth transistor being coupled to receive a second timing signal generated during a later half of the second timing period, whereby all the eighth, ninth and tenth transistors are turned on to forcibly change the potential of the other end of the second transistor to the first supply voltage, when the data input and the carry input assume a second logic condition which is opposite to the second logic condition during a timing period defined by the second timing signal.

9. The half adder as claimed in claim 8 wherein the first, second, third, eighth, ninth and tenth transistors are of a first channel conductivity type, and the fourth to seventh transistors are of a second channel conductivity type which is opposite to the first channel conductivity type.

10. The half adder as claimed in claim 8 wherein the first, second, third, eighth, ninth and tenth transistors are of a P-channel type, and the fourth to seventh transistors are of an N-channel type, and wherein the first supply voltage terminal is a $V_{DD}$ terminal and the second supply voltage terminal is a $V_{SS}$ terminal.

* * * * *